Figure 1:
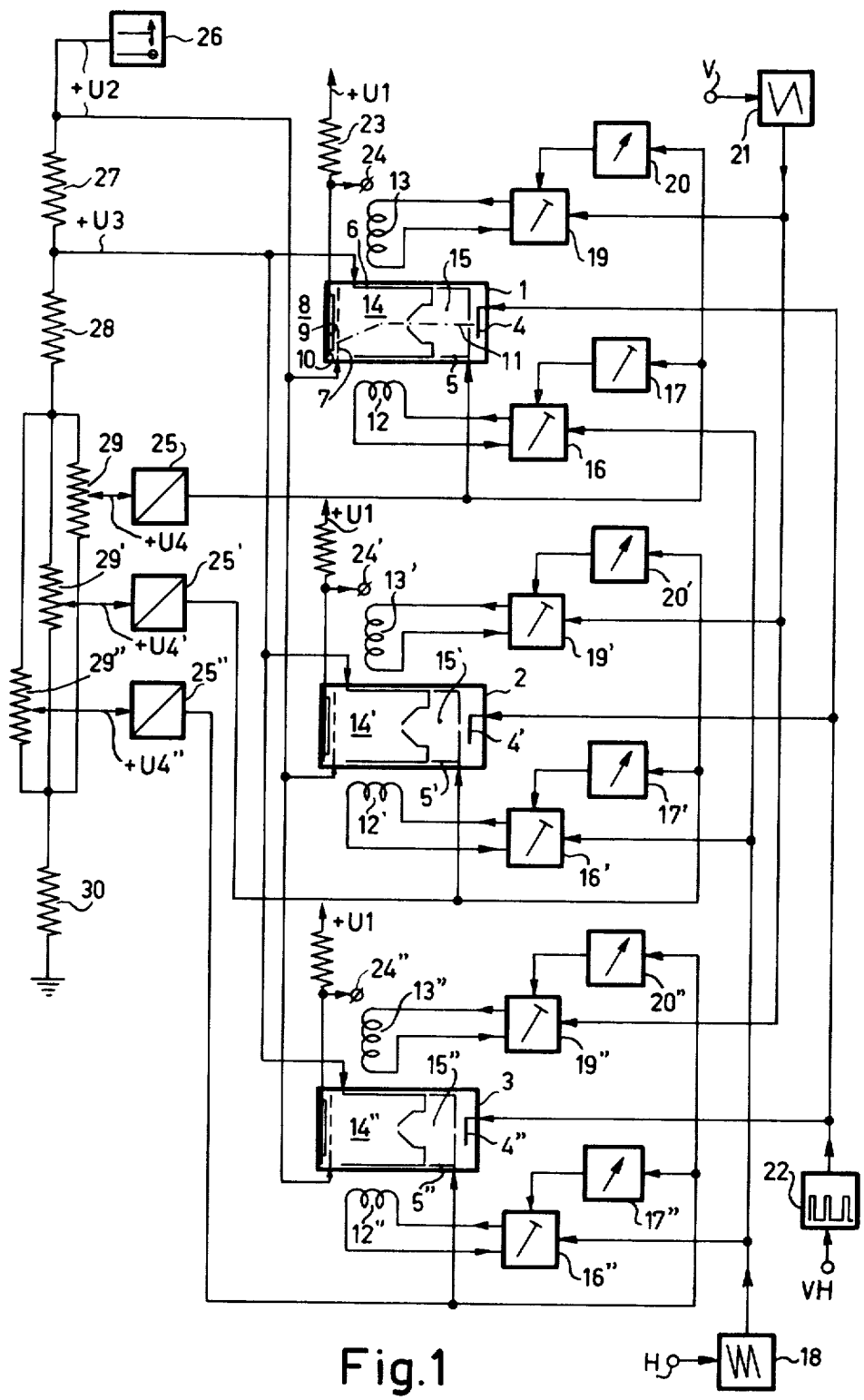

United States Patent [19]

van Roosmalen et al.

[11] 4,051,512
[45] Sept. 27, 1977

[54] COLOR TELEVISION CAMERA HAVING AT LEAST TWO PICK-UP TUBES

[75] Inventors: Johannes Hendrikus Theodorus van Roosmalen; Pieter Zuidhof, both of Eindhoven, Netherlands

[73] Assignee: U.S. Philips Corporation, New York, N.Y.

[21] Appl. No.: 672,231

[22] Filed: Mar. 31, 1976

[30] Foreign Application Priority Data

Apr. 10, 1975 Netherlands .................. 7504250

[51] Int. Cl.² ............................................. H04N 9/09
[52] U.S. Cl. .................................. 358/51; 315/391
[58] Field of Search .................. 358/51; 315/391, 393

[56] References Cited

U.S. PATENT DOCUMENTS 2,744,951  5/1956  Gibson ........................... 358/51

3,305,750  2/1967  Schneider ..................... 358/51 X

FOREIGN PATENT DOCUMENTS 1,134,703  8/1962  Germany ........................ 358/51

Primary Examiner—Richard Murray
Assistant Examiner—Mitchell Saffian
Attorney, Agent, or Firm—Frank R. Trifari; Henry I. Steckler

[57] ABSTRACT

A color television camera having at least two pick-up tubes while the electromagnetic deflection and the electrostatic focussing is done in spatially removed places. A voltage source for supplying the anodes of the pick-up tubes is not stabilized but by affecting the deflection, registration of the line raster is maintained for voltage variations. Control of the voltage source offers the possibility for electronic "zooming" of the scene to be recorded.

7 Claims, 3 Drawing Figures

COLOR TELEVISION CAMERA HAVING AT LEAST TWO PICK-UP TUBES

The invention relates to a colour television camera having at least two pick-up tubes, which camera comprises deflection means and focussing means for line and field deflection or focussing respectively of an electron beam generated in each pick-up tube and which scans a target plate according to a line raster, said deflection or focussing means for signal supply being connected to a deflection circuit or a focussing circuit respectively whilst the line and field deflection circuits comprise deflection stages suitable for adjusting the raster registration of the line rasters formed by the electron beams in the various pick-up tubes.

Such a colour television camera is described inter alia in the German Patent Specification No. 1,134,703. The camera operates with three pick-up tubes provided with electromagnetic deflection and focussing means. The raster registration adjustment is done for two pick-up tubes by a setting of two coupled potentiometers for each tube. One potentiometer acts on the focussing current and the other on a voltage for supply to an accelerating anode present in the pick-up tube. In this respect it is specified that at the adjustment a linear change of the anode voltage must be accompanied by a square-law change in the focussing current, which would not be necessary if electrostatic focussing were used.

It is described that, to ensure proper operation of the camera it is necessary that a stabilized supply voltage is used for the pick-up tubes. This requirement for a stabilized supply voltage for the pick-up tubes and also the application of coupled potentiometer entails expenses which are deemed unacceptable for a colour television camera intended for classes of customers outside the professional sector.

It is an object of the invention to provide a cheap colour television camera for which especially a non-stabilized supply voltage can be used for the pick-up tubes without voltage fluctuations producing deflection errors and consequent errors in the raster registration i.e. it is an object to ensure that the line rasters of the pick-up tubes remain in registration independent of supply voltage fluctuations.

A colour television camera according to the invention is therefore characterized in that the pick-up tubes are provided with electromagnetic deflection means and an electrostatic focussing means which in each pick-up tube exercise a substantially spatially removed action for deflection and focussing of the electron beam, whilst the camera comprises a voltage source and voltage setting stages connected thereto which, each associated with one of the pick-up tubes, are connected for focussing to the electrostatic focussing means of the relevant pick-up tubes and which for a deflection correction are connected to the deflection circuit associated with the relevant pick-up tube for the electromagnetic line and raster deflection.

Furthermore, with a colour television camera according to the invention "zooming" which is to be performed on a scene to be picked-up can be done electronically instead of optically. A camera according to the invention has therefore the characteristic that the said voltage source comprises a variable voltage source connected to an ohmic voltage divider, whilst terminals on the voltage divider are connected to anodes present in the pick-up tubes.

When very large supply voltage variations occur or when electronic "zooming" is used over a control range in the order of magnitude of 1 to 2, a camera according to the invention also has the characteristic that the said voltage setting stages are each connected through a control stage comprising a non-linear voltage divider to the deflection stage which is part of the deflection circuit for the line — or field deflection respectively at the pick-up tube.

Figures 2, 3:
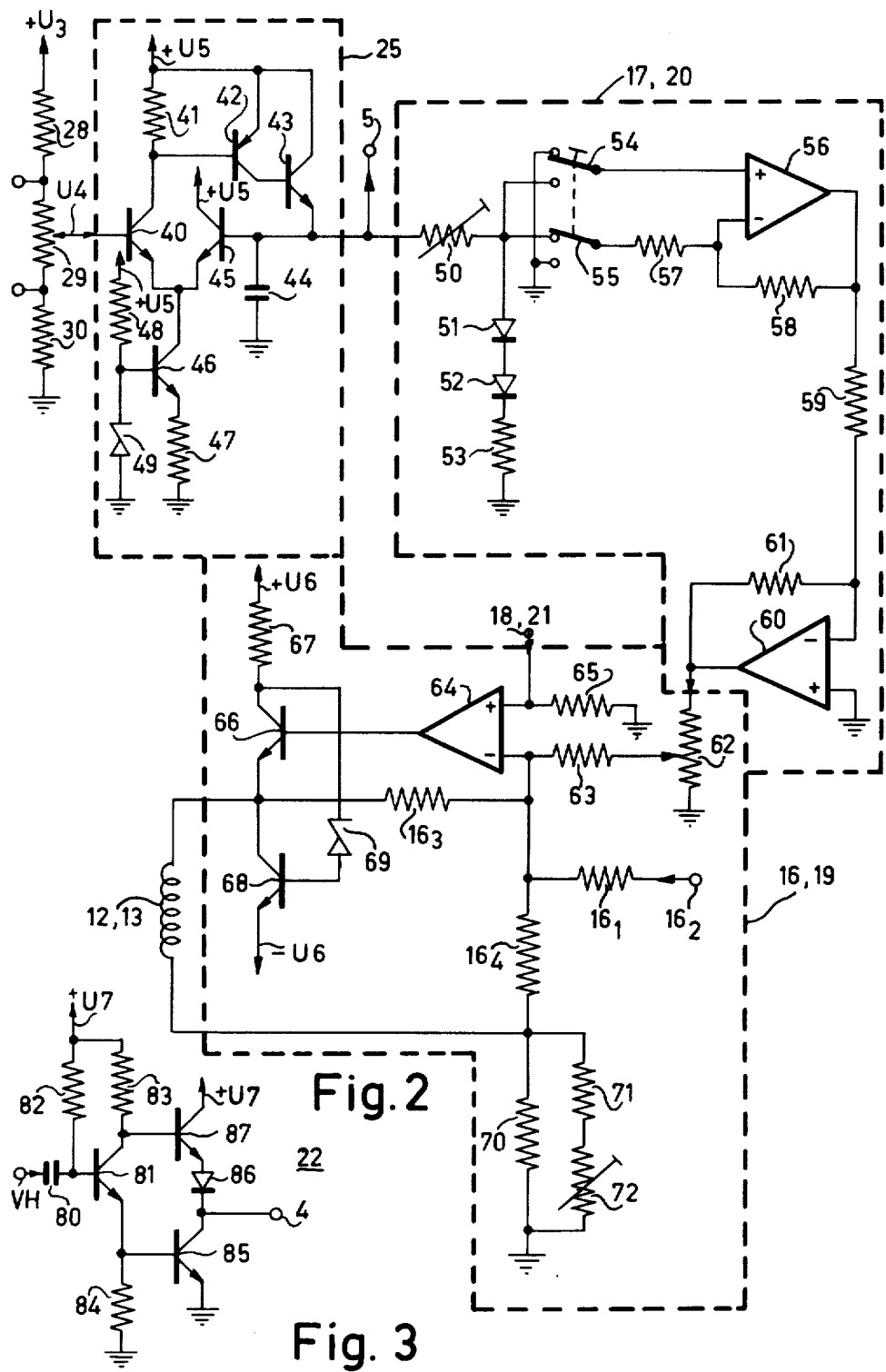

By way of example the invention will be explained in more detail with reference to the following figures in which FIG. 1 shows in a block diagram an embodiment of a camera according to the invention, FIG. 2 shows some interconnected blocks of FIG. 1 in an elaborated circuit diagram and FIG. 3 shows a block of FIG. 1 which is further elaborated in a circuit diagram.

For a colour television camera which is shown in the form of a block diagram in FIG. 1 three pick-up tubes present therein are indicated by 1, 2 and 3. In a manner which is not shown, the light derived from a scene to be picked-up is split into three colour components which are each converted to an electrical video signal by means of a pick-up tube, which video signals are suitable for reproduction at a reproduction device. The pick-up tubes 1, 2 and 3 deliver video signals which, for example, belong to the red, green and blue colour component of the light of the scene. Other combinations are also possible.

The pick-up tubes 1, 2 and 3 which are in principle identical are each drawn diagrammatically in cross-section whilst the description of the pick-up tubes 1, 2 and 3 will in the first instance be done on the basis of the pick-up tube 1. The pick-up tube 1 is provided with a cathode 4, a first anode 5, a second anode 6, a third anode 7 which is constructed as a gauze anode and a target plate 8 which is composed of a semiconductor layer 9 and an electrically conducting, transparent signal plate 10. When the pick-up tube 1 is in operation, the cathode 4 supplies an electron beam 11 shown by a dashed-dotted line. The electron beam 11 is deflected by the deflection means 12 and 13 which are applied outside the pick-up tube 1, which operate in an electromagnetically manner and which have consequently been drawn as coils. The deflection means 12 attends to the line deflection in the pick-up tube 1 and the deflection means 13 attends to the field deflection so that a line raster is formed on the semiconductor layer 9 of the target plate 8 in a manner as usual in television. In the pick-up tube 1 the deflection of electron beam 11 occurs in an area which is indicated by 14. In the pick-up tube 1 focussing of electron beam 11 occurs between the first anode 5 and the facing end of the second anode 6 so that for focussing it holds that it is done by means of a focussing means (5, 6) in an area which is designated by 15 in the pick-up tube 1. Performing an electromagnetic deflection in the pick-up tube 1 by means of the deflection means 12 and 13 and an electrostatic focussing by means of the focussing means (5, 6) in substantially spatially removed places 14 and 15 is essential for the proper operation of the camera according to the invention. Such a pick-up tube 1, 2 or 3 is described inter alia in an article in "IEEE Transactions on Electron Devices", Vol. Ed-18, No. 11, November 1971, pages 1087–1093. The construction of the pick-up tubes 1, 2 and 3 shown in FIG. 1 is a simplified construction of that given in the said article, particularly of that given in FIG. 9 on page 1091. In the construction of the pick-up tubes 1, 2 and 3 no so-called Whenelt cylinder is present between the cathode 4 and the first anode 5 whilst only two anodes 5 and 6 are used for focussing instead of three. Apart from the difference with reference to an electron-gun (4, 5) formed in this manner in the pick-up tube 1 and which is yet be described, we refer to said article for the further operation of the pick-up tubes 1, 2 and 3.

For signal supply the line deflection means 12 are connected to a deflection stage 16. The deflection stage 16 is connected to an output of a control stage 17 and to that of a sawtooth generator 18, which yields a line deflection circuit (16, 17, 18). A signal H is supplied to the sawtooth generator 18 which operates as line control signal to cause the generator 18 to supply a sawtooth signal of a line period. Consequently the deflection stage 16 produces a sawtooth deflection current through the line deflection means 12 at a given amplitude, whilst the deflection stage 16 is provided with means for adjusting a direct current in the line deflection means 12 which operates as adjustable shift current in performing the raster registration of the line raster, more specifically in the line scanning direction. The control stage 17 acts by affecting the adjusted shift current in accordance with a given function.

In a similar manner the field deflection means 13 are connected to a deflection stage 19 which is connected to a control stage 20 and a (field) sawtooth generator 21 to which a field control signal V is supplied. In this manner a field deflection circuit (19, 20, 21) is formed with yields a sawtooth signal of a raster period. The deflection stage 19 is provided with means for adjusting a shift current through the field deflection means 13 which shift current can be influenced by means of the control stage 20.

For the further connections to the pick-up tube 1 it holds that the cathode 4 is connected to the output of a signal generator 22 for supplying under the influence of a supplied line and field blanking signal VH a pulse-shaped signal which suppresses the electron beam in the line and field blanking periods which are customary in television.

The signal plate 10 of the target plate 8 of the pick-up tube 1 is connected through a resistor 23 to a terminal having a voltage + U1 of a voltage source U1 not further specified here, another terminal of which is connected to earth. The junction of the resistor 23 and the signal plate 10 is connected to an output terminal 24 which carries the picture signal generated by the pick-up tube 1 which picture at display corresponds to a scene recorded by the pick-up tube 1.

The first anode 5 of the pick-up tube 1 is connected to an output of a stage 25 which is furthermore connected to inputs of the control stages 17 and 20.

The third anode 7 of the pick-up tube 1 is connected to a voltage +U2 which is applied direct by an adjustable voltage source 26. The voltage source 26 is a high voltage source which is commonly used for television cameras for supplying a voltage of, for example, some hundreds of volts, the source 26 not being stabilized for voltage variations. The second anode 6 is connected to a voltage +U3 which is obtained from a voltage divider which is connected to the source 26 and which voltage divider is formed by means of a series circuit of a resistor 27, a resistor 28, three parallel-connected potentiometers 29, 29' and 29", and a resistor 30 connected to earth. In this way a voltage source (26–30) is formed comprising the adjustable voltage source 26 and an ohmic voltage divider (27–30), whilst the input of the stage 25 is connected to a tap of the potentiometer 29, which tap is connected to a voltage +U4. The potentiometer 29 and the stage 25 together constitute a voltage setting stage (25, 29) whilst it will be shown that the stage 25 operates as an emitter follower stage. The pick-up tube 1 is connected to a focussing circuit (25–30).

The pick-up tubes 2 and 3 which are in principle identical to the pick-up tube 1 are included in the colour television camera according to FIG. 1 in the same manner as the pick-up tube 1. The components present in the pick-up tube 2 and the components connected thereto are designated, insofar as they have been designated, by means of a single dash and for the pick-up tube 3 a double dash mark has been used. So the tap of the potentiometer 29' which carries a voltage +U4' is connected through the emitter follower stage 25', to the first anode 5' of the pick-up tube 2 and to the control stages 17' and 20' which are connected to the respective deflection stages 16' and 19' for supplying a signal to the respective deflection means 12' and 13'. The substantially spatially removed places where the electro-magnetic deflection and the electrostatic focussing take place are designated by 14' and 15' respectively. The pick-up tube 2 supplies a picture signal to the output terminal 24' in the same manner as pick-up tube 2 to the output terminal 24. For the pick-up tube 3 all this is indicated by means of the double dash mark.

To explain the operation of the colour television according to FIG. 1 the following applies.

We start from a given, fixed value of the voltage +U2. Depending on the tolerances in the shapes and the positions of the anodes 5, 6 and 7, the cathode 4 in the pick-up tubes 1, 2 and 3 and the deflection means 12 and 13, the required voltages and currents must be different to achieve that a proper raster registration is obtained when displaying the picture signals present at the output terminals 24, 24' and 24". The voltage setting stages (25, 29), (25', 29') and (25", 29") give directly an adaptation of the focussing and affect, through the adjusted control stages 17, 20; 17', 20' and 17", 29" the deflection stages 16, 19; 16', 19' and 16", 19" which for further corrections possess other, customary adjusting features. It is assumed that for the given, fixed value of voltage +U2, the colour television camera according to FIG. 1 is optimally adjusted for focussing, deflection and raster registration which results in an optimum picture quality at display of the generated picture signal.

From handbooks equations of motion can be obtained which apply to the electrons in the electron beam 11 of the pick-up tube 1. So for the equation of motion in a system of axes having three perpendicular axes, x, y, and z, where the axial direction z is found by means of the righthand rule or the corkscrew rule with a rotation of the axis x to the axis y, $$\frac{d^2x}{dt^2} = -n(E_x + B_z\frac{dy}{dt} - B_y\frac{dz}{dt}) \tag{1}$$

$$\frac{d^2y}{dt^2} = -n(E_y + B_x\frac{dz}{dt} - B_z\frac{dx}{dt}) \tag{2}$$

$$\frac{d^2z}{dt^2} = -n(E_z + B_y\frac{dx}{dt} - B_x\frac{dy}{dt}) \tag{3}$$

where $n$ is the ratio between charge and mass of the electron and $E_x$, $E_y$ and $E_z$ and $B_x$, $B_y$ and $B_z$ respectively are the electrical field strengths and the magnetic induction in the $x$, $y$ and $z$ direction.

It is assumed that the voltage $+U2$ supplied by the source 26 of FIG. 1 changes, so that the electrical field strengths E in the pick-up tube 1 (and 2 and 3) increase by a factor $a^2$, whilst at the same time the magnetic inductions B increase by a factor $a$. It then follows for the equation of motion (1):

$$\frac{d^2x}{dt^2} = -n(a^2E_x + aB_z\frac{dy}{dt} - aB_y\frac{dz}{dt}) \qquad (4)$$

From the equation of motion (4) it can be derived that:

$$\frac{d^2x}{a^2dt^2} = -n(E_x + \frac{B_z}{a}\frac{dy}{dt} - \frac{B_y}{a}\frac{dz}{dt}) \qquad (5)$$

In the same manner the equations of motion (2) and (3) can be converted.

If $x = f_1(t)$, $y = f_2(t)$ and $z = f_3(t)$ are solutions for the equations of motion (1), (2) and (3), it follows that $x = f_1(at)$, $y = f_2(at)$ and $z = f_3(at)$ are solutions for the converted equations of motion (5, etc.).

It appears that the electron beams have not been submitted to a mutual shift in place, but that the motion in each point has been accelerated a-times. For the case that the inductions B given in the equation (5) are generated by the deflection currents such as they flow into the line and field deflection means 12 and 13, the result is that the magnitudes of the line and the field deflection on the target plate 8 have not been changed. However, as follows from the description of the construction of the control stages 17 and 20 and the deflection stages 16 and 19 the total deflection currents are not affected in the camera according to FIG. 1, but only the shift currents adjusted for the optimum raster registration are changed. In this respect it is assumed that the inductions B of the equation are generated by the shift currents. The result is that when the electrical field strengths in the pick-up tube 1 change by a factor $a^2$ and when the magnetic inductions produced by the shift currents change by a factor $a$, the magnitude of the line and field deflection on the target plate 8 changes by a factor $a$ and that an optimum focussing and raster registration is maintained. As a general rule it applies here that the requirements $(E/B^2)$ is constant must be satisfied. By way of example it holds that with a 10% variation in the voltage $+U2$ which yields $a = 1.05$ for $a^2 = 1.1$, the magnitude of the line and field deflection has changed by 5%. For the voltage variations in the order of magnitude of 10% which occur at random the change of the line raster by 5% is entirely permissible. It holds here that in practice, for small voltage variations the quadratic connection between the electric and the magnetic magnitudes can be approximated by a linear function.

Not only do supply voltage variations at the pick-up tubes 1, 2 and 3 not affect the optimally adjusted and remaining raster registration and focussing in the pick-up tubes 1, 2 and 3 but the described effect can also be utilized for an electronic "zooming" by adjusting the supply voltage source 26. When changing the voltages U2, U3 and U4 by a factor $a^2 = 4$ and an associated change in the shift current by a factor $a = 2$, a change by a factor 2 follows for the magnitude of the line and the field deflection whilst the optimum raster registration is maintained. It holds here that independent of the magnitude of the setting range and the initial value for which the camera has been adjusted that the non-linear connection between voltage and current must be approximated by a more or less quadratic connection, or, starting from the voltage, that the deflection current must change more or less parabolically.

By way of illustration it must be noted that the voltage $+U2$ is, for example, adjustable between 200 and 800 volts, the voltage $+U3$ being variable between 90 and 360 V. The voltage $+U4$ can then, for example, be adjusted between 12 and 64 V.

In practice it appears to be essential that the electric field strength E and the magnetic induction B are produced in spatially removed areas and that they exercise there their focussing and deflecting action respectively. Namely, the presence of anodes in the pick-up tube near the electron beam 11 which is to be deflected, disturbs the magnetic deflection field, and magnetic shielding, and, consequently, losses occur. The part of the second anode 6 which is located near the wall in the pick-up tube 1 substantially causes no magnetic shielding as it has been applied as a thin layer to the wall. It furthermore applies that tolerances in the shapes and positions of the anodes present in the pick-up tubes 1, 2 and 3 and of the deflection means provided near the pick-up tubes 1, 2 and 3 each require their own voltage- and current setting which, due to the separate positioning implies that no interaction will affect the raster registration.

FIG. 2 shows detailed circuit diagrams for some blocks of the block diagram of FIG. 1. The emitter follower stage 25, the control stage 17 or 20 and the deflection stage 16 or 19 are shown in detail. The control stages 17 and 20 are identical whilst the construction of the deflection stages 16 and 19 is in principle the same, however the line deflection is adapted for an inherent inductive character and the field deflection for an ohmic character.

FIG. 2 shows the resistors 28 and 30 and the potentiometer 29 of the voltage source (26–30) of FIG. 1. The tap of the potentiometer which carries the voltage $+U4$ is connected in the stage 25 to the base of an npn transistor 40 whose collector is connected through a resistor 41 to a terminal having voltage $+U5$ and direct to the base of a pnp transistor 42. The collector of the transistor 42 is connected to the base of an npn transistor 43 whilst the emitter and collector of transistors 42 and 43 respectively are connected to the terminal having a voltage $+U5$. The emitter of the transistor 43 is connected to earth through a capacitor 44 and direct to the base of an npn transistor 45 to whose collector the voltage $+U5$ is supplied and whose emitter is connected to that of transistor 40. The emitters of the transistors 40 and 45 are connected to the collector of an npn transistor 46 whose emitter is connected to earth through a resistor 47. The base of the transistor 46 is connected to the voltage $+U5$ through a transistor 48 and to earth through a zener diode 49. The voltage-carrying terminal of the capacitor 44 is connected to the output of the emitter follower stage 25 which is connected to the first anode 5 of one of the pick-up tubes 1, 2 or 3 and to the control stage (17, 20). The voltage $+U4$ is found at the output of the stage 25 whilst the emitter follower stage 25 has been provided to ensure that the current necessary for the anode 5 does not affect the voltage drop across the potentiometer 29.

The input of the control stage (17, 20) is connected to earth through a series circuit of a variable resistor 50, two diodes 51 and 52 and a resistor 53. The value of the resistor 50 is large with respect to the resistance value of the conducting diodes 51 and 52 and the resistor 53 so that a current setting is effected at the diodes 51 and 52 by means of the resistor 50. In this way a voltage divider (50-53) is formed which has a non-linear characteristic whilst the diode-resistor combination gives an approximately parabolic characteristic which can be adjusted by means of the resistor 50.

The junction of the resistor 50 and the diode 51 is connected to selector contacts of a switch 54 and a switch 55 which in the drawing have mechanically coupled switching arms. Another selector contact of each of the switches 54 and 55 is connected to earth. The output of the switch 54 is connected to a (+)-input of a differential amplifier 56 and through a resistor 57 the output of the switch 55 is connected to the (−)-input thereof which is connected to the amplifier output through a feedback resistor 58. Supply voltages and correction circuits necessary for the differential amplifier 56 and further differential amplifiers still to be indicated have not been shown for simplicity. The coupled switches 54 and 55 and the differential amplifier 56 operate as an amplifier, the polarity of the output voltage depending on the position of the switch 54 and 55.

Through a resistor 59 the output of the differential amplifier 56 is connected to the (−)-input of differential amplifier 60 whose (+)-input is connected to earth. Through a resistor 61 the output of the differential amplifier 60 is fed back to the (−)-input. The output of the differential amplifier 60 is connected to the output of the control stage (17, 20) which is connected to the deflection stage (16, 19) and which is connected therein to earth through a potentiometer 62.

The potentiometer 62 is provided with a tap which is connected to the (−)-input of a differential amplifier 64 through a resistor 63. Through a resistor 65 the (+)-input of the differential amplifier 64 is connected to earth and it is furthermore connected to the output of the line sawtooth generator 18 or to that of the field sawtooth generator 21 of FIG. 1. When connected to the line sawtooth generator 18 the (−)-input of the differential amplifier 64 present in the line deflection stage 16 is also connected to a resistor $16_1$ whose other side is connected to an input terminal $16_2$. Then, for example, an output of the field sawtooth generator 21 is connected to the input terminal $16_2$ which causes a so-called "skew" correction in which learning (vertical) lines of the line raster occurring in the raster scan direction are corrected in the pick-up tube 1, 2 or 3 so that a rectangular line raster is obtained. Besides that in the embodiment used as the line deflection stage 16 a feedback resistor $16_3$ which is connected to the (−)-input of the differential amplifier 64 is provided which is absent in the embodiment used as the field deflection stage 19.

The output of the differential amplifier 64 in the deflection stage (16-19) is connected to the base of an npn transistor 66 to whose collector a voltage +U6 is supplied through a resistor 67. The emitter of the transistor 66 is connected to the collector of an npn transistor 68 whose base is connected to the collector of the transistor 66 through a zener diode 69 and to whose emitter a voltage −U6 is supplied. The junction of the transistors 66 and 68 is connected to the deflection means (12, 13), whilst in the construction of the line deflection stage 16 the junction is also connected to the feedback resistor $16_3$. In the deflection stage (16, 19) the other terminal on the deflection means (12, 13) is connected to a junction of the resistor $16_4$ whose other terminal is connected to the (−)-input of the differential amplifier 64, to earth by means of a resistor 70 and to earth of a resistor 71 and variable resistor 72 by means of a series circuit. During the adjustment of the camera according to FIG. 1 the sawtooth amplitude for the desired deflection is set by means of the resistor 72. The sawtooth generator 18 or 21 might have been constructed as a variable generator instead. In the construction of the field deflection stage 19 the resistor $16_4$ is a short-circuited connection.

Depending on the rating of the components of the deflection stage (16, 19) the transistors 66 and 68 which operate as a class B-, A- or combined AB-circuit produce a sawtooth current through the deflection means (12, 13). During adjustment of the camera the potentiometer 62 is used to adjust the raster registration. Changing the setting of the potentiometer 62 present in the line deflection stage 16 causes the scanning line on the target plate 8 in the pick-up tube 1 (or 2 or 3) to shift in the direction of line deflection. In the embodiment used as the field deflecting stage 19 a shift in the field deflection direction is produced. The direction of the shift can be reversed by means of the switches 54 and 55 of the control stage (17, 20).

FIG. 3 shows a circuit diagram of the signal generator 22 of FIG. 1, which, under the control of the line- and field suppression signal VH supplies a pulse-shaped beam blanking signal to the cathode 4 of the pick-up tube 1 (and to the cathode 4' and 4" of the pick-up tubes 2 and 3).

Through a capacitor 80 the signal VH is supplied to the base of an npn transistor 81 whose base is also connected through a resistor 82 to a terminal having the voltage +U7. Through a resistor 83 the voltage +U7 is supplied to the collector of the transistor 81, whilst the emitter is connected to earth through a resistor 84 and also to the base of an npn transistor 85. The collector of the transistor 85 is connected to the output of the signal generator 22 which is connected to the cathode 4 and is also connected to the cathode of a diode 86. The anode of the diode 86 is connected to the emitter of an npn transistor 87 to whose collector the voltage +U7 is supplied, the base being connected to the collector of a transistor 81.

In the absence of a negative-going pulse in the signal VH the transistor 81 conducts whilst the voltage-drop across the resistor 84 biases the transistor 85 to render it conducting. Then earth potential is found at the terminal for the cathode 4 and the voltage drop across the resistor 84 equals the voltage drop across the base-emitter diode of the transistor 85. Disregarding the voltage drop between the collector and the emitter of transistor 81 the collector also has the base-emitter threshold voltage so that the transistor 87 and the diode 86 cannot conduct as this requires at least double the base-emitter threshold voltage at the base of the transistor 87.

The occurrence of a negative-going pulse in the signal VH renders the transistor 81 non-conducting and consequently also the transistor 85. Then substantially the voltage +U7 is found at the base of the transistor 87 which renders the transistor 87 and the diode 86 conducting. During the negative-going pulse in the signal VH the voltage +U7 is found at the terminal for the cathode 4 minus the voltage drop across the diode 86 and the transistors 87. The voltage +U7 obtained from the signal generator 22 in FIG. 1 has been chosen sufficiently high that, when it is supplied to the cathodes 4, 4' and 4" of the pickup tubes 1, 2 and 3 the value is in the order of magnitude or above it of that of the voltages +U4, U4' and U4" present at the first anodes 5, 5' and 5" which result in no electron beam (11) being generated. So it appears that in the pick-up tube 1(and the pick-up tubes 2 and 3) an electron gun (4, 5) is formed which operates without a control grid which is normally used for the beam suppression.

What is claimed is:

1. A color television camera circuit for use with a plurality of camera pick-up tubes each of said tubes having electro-magnetic deflection means for line and field deflection and electrostatic focusing means for a raster scanned electron beam, said deflection and focusing means providing a substantially spatially removed action for deflection and focusing within each tube, said circuit comprising line and field deflection circuits adapted to be coupled to said deflection means respectively, each of said deflection circuits comprising a deflection stage means for adjusting the raster registration of said respective tubes, a plurality of focusing circuits adapted to be coupled to said focusing means respectively, a voltage source, and a plurality of voltage setting stages for each of said tubes coupled between said source and the focusing means and deflection circuits for each tube respectively.

2. A color television camera circuit as claimed in claim 1, wherein said voltage source comprises an adjustable voltage source and ohmic voltage divider coupled to said adjustable source, the being connected to anodes present in the pick-up tubes.

3. A color television camera circuit as claimed in claim 1, further comprising a plurality of control stages, each comprising a non-linear voltage divider coupled between said voltage setting stages and said deflection stages respectively.

4. A color television camera circuit as claimed in claim 3, wherein each of said non-linear voltage dividers comprises a series circuit of a variable resistor, at least one diode, and a second resistor.

5. A color television camera circuit as claimed in claim 3 wherein each of the deflection stages comprises a potentiometer means coupled to a respective control stage for adjusting the raster registration.

6. A color television camera circuit as claimed in claim 1, wherein said voltage source comprises a plurality of potentiometers, each having a tap, and each of the voltage setting stages comprises an emitter follower stage coupled to said taps respectively.

7. A color television camera circuit as claimed in claim 1, further comprising a signal generator means coupled to the cathodes of each of the pick-up tubes for supplying a pulse-shaped signal for beam suppression, said signal generator delivering positive-going pulses to the cathodes which together with the first anode comprise an electron gun in each of the pick-up tubes.

* * * * *